(12) United States Patent
Jimenez

(10) Patent No.: US 8,091,514 B2
(45) Date of Patent: Jan. 10, 2012

(54) ENERGY RE-CLAIMER

(76) Inventor: Jesus Martinez Jimenez, Laveen, AZ (US)

( * ) Notice: Subject to any disclaimer, the term of this patent is extended or adjusted under 35 U.S.C. 154(b) by 656 days.

(21) Appl. No.: 12/211,665

(22) Filed: Sep. 16, 2008

(65) Prior Publication Data

US 2009/0120616 A1     May 14, 2009

Related U.S. Application Data

(60) Provisional application No. 60/987,003, filed on Nov. 9, 2007, provisional application No. 60/988,552, filed on Nov. 16, 2007.

(51) Int. Cl.
     *F22D 1/02*         (2006.01)
(52) U.S. Cl. ..................................... 122/20 B; 122/421
(58) Field of Classification Search ............... 122/38, 122/20 R, 20 B, 421, 135.1, 422; 165/163, 165/166
See application file for complete search history.

(56) References Cited

U.S. PATENT DOCUMENTS

| | | | |
|---|---|---|---|
| 2,143,287 A | | 1/1939 | Smith |
| 2,882,023 A | | 4/1959 | Rizzo |
| 3,639,963 A * | | 2/1972 | Maher ................... 29/890.037 |
| 4,037,567 A * | | 7/1977 | Torres ...................... 122/20 B |
| 4,043,014 A | | 8/1977 | Wilson |
| 4,175,518 A * | | 11/1979 | Reames, Jr. ............. 122/20 B |
| 4,222,349 A * | | 9/1980 | Kadan et al. ............. 122/20 B |
| 4,233,961 A | | 11/1980 | Kelly |
| 4,275,687 A * | | 6/1981 | Sasaki ..................... 122/20 B |
| 4,295,519 A | | 10/1981 | Bellaff |
| 4,359,187 A * | | 11/1982 | Moore .......................... 237/55 |
| 4,887,586 A * | | 12/1989 | Walters ...................... 126/101 |
| 5,097,801 A * | | 3/1992 | Burns ...................... 122/20 B |
| 5,699,852 A | | 12/1997 | Park et al. |
| 6,167,951 B1 * | | 1/2001 | Couch et al. .............. 165/160 |
| 6,564,755 B1 * | | 5/2003 | Whelan ..................... 122/20 B |
| 7,360,507 B1 * | | 4/2008 | Logsdon .................. 122/367.1 |
| 2008/0282996 A1 * | | 11/2008 | Veitch et al. .............. 122/20 B |
| 2010/0126432 A1 * | | 5/2010 | Eberle et al. .............. 122/20 B |

* cited by examiner

*Primary Examiner* — Gregory A Wilson
(74) *Attorney, Agent, or Firm* — Richard S Erbe

(57) ABSTRACT

An energy re-claimer is provided for preheating water prior to the water entering a conventional residential, commercial or industrial gas water heater. The energy re-claimer is mounted on top of the water heater between the draft diverter and the hot air flue. The energy re-claimer is preferably a double wall construction that is larger in diameter than the draft diverter and hot air flue in order to allow normal passage of hot air through the system; however, a single wall construction may also be used. Tap water enters a pipe inside the double wall construction and is heated prior to being directed through the water heater. The pipe may be constructed of a number of straight lengths connected by returns or may be in the form of a single straight section connected to a coil made of connected curving sections that surround the axis of the energy re-claimer. A condensation collector may be provided between the draft diverter and the energy re-claimer to collect any condensation that may form as a result of cooling gases and prevent the condensate from falling into the water heater where it could extinguish the flame.

12 Claims, 8 Drawing Sheets

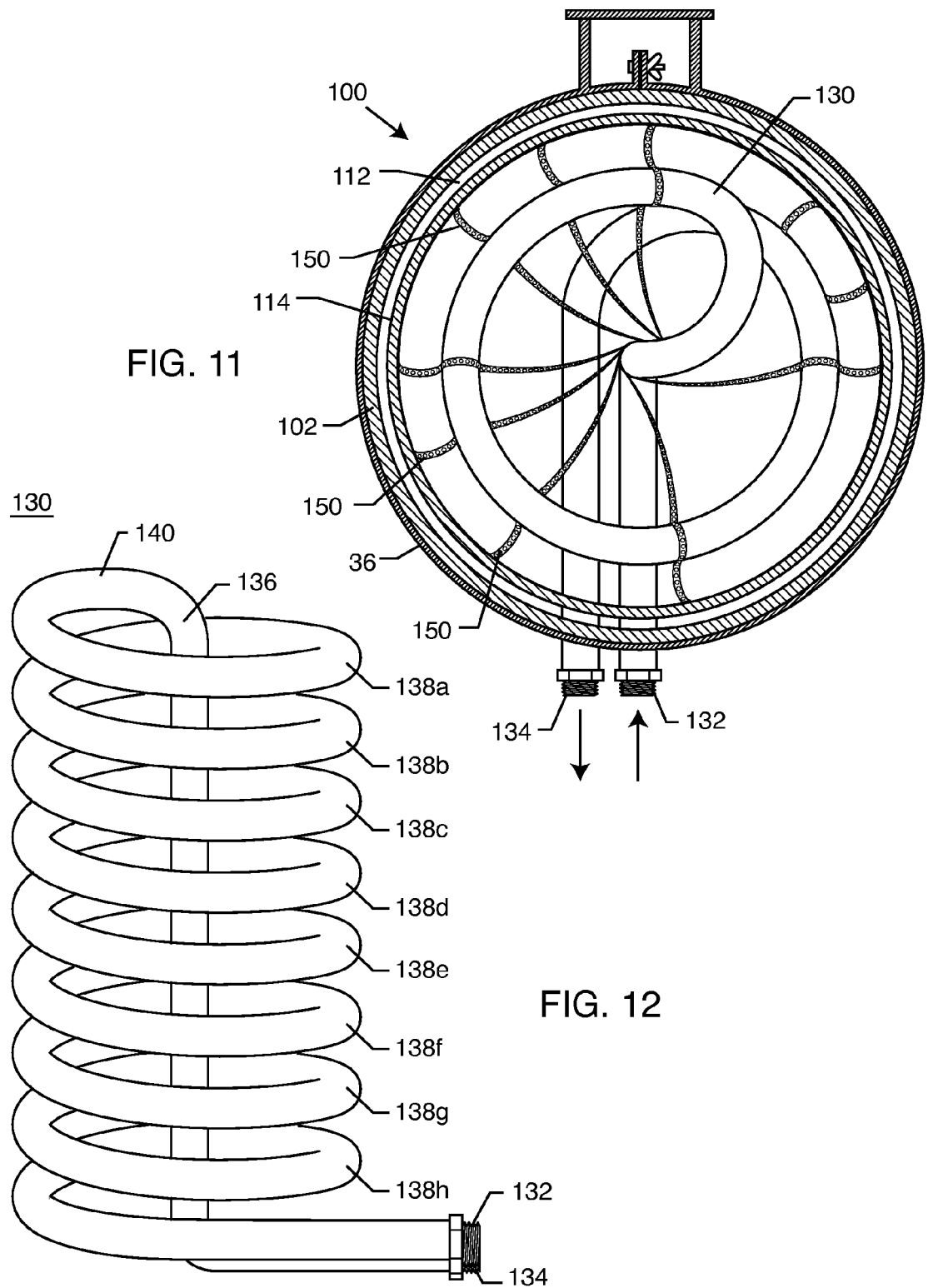

ENERGY RE-CLAIMER

RELATED APPLICATIONS

This application claims the benefit of U.S. Provisional Patent Application No. 60/987,003 filed Nov. 9, 2007, entitled "Gas Water Heater Energy Re-Claimer," and U.S. Provisional Patent Application No. 60/988,552 filed Nov. 16, 2007, entitled "Gas Water Heater Coil Energy Re-Claimer," both of which are incorporated herein by reference.

BACKGROUND OF THE INVENTION

1. Field of the Invention

The present invention relates to methods and devices for effecting heat exchange between hot gases and fluids. More particularly, the present invention relates to a heat exchange device or energy re-claimer for preheating tap water with hot gases exiting a hot water heater. The device in accordance with the present invention may be used with residential, commercial or industrial water heaters. The energy re-claimer according to the present invention includes new and novel features to enhance the efficiency of the heat exchange between hot gases and water, thus enabling the owner to use less fuel for the heating of the tap water in the water heater.

2. General Background and State of the Art

Water heaters, especially those of the gas-fired type, have been known and used for years in homes, businesses, and industrial facilities. The typical gas-fired water heater burns a flammable gas that produces heated gases, which pass under a tank holding tap water that is to be heated. The tank is preferably constructed of a heat conducting material.

Once the hot gases have passed under the tank, the gases are normally vented to the outside through a flue. The vented gases are still hot, and thus much of the energy in the gases is wasted. With the costs of fuel rising rapidly, it would be advantageous and desirable if the energy in the vented gases could be utilized to make the use of the fuel in the water heater more efficient and lower the overall demand for fuel. With tens of millions of gas-fired water heaters currently in use, reducing the amount of fuel they use can provide far-reaching benefits to consumers, businesses, the environment and the economy as well.

There is a need, therefore, for an energy re-claiming device and method to provide more efficient heating of tap water in a water heater for residential, commercial and industrial use.

There is also a need for an energy-reclaiming device and method that can be used in conjunction with conventional water heaters.

None of the prior art heat exchange devices address nor meet these needs while providing the advantages of the present invention.

SUMMARY OF THE INVENTION

The disadvantages of prior art heat exchangers and water heaters are overcome by the present invention, which, in a broad aspect, provides the user with an energy re-claimer that utilizes the hot gases normally vented from a water heater to preheat tap water prior to the water flowing into the water heater. The energy re-claimer is preferably mounted between the draft diverter and flue of a water heater.

The present invention provides an energy re-claimer in the form of a single or double-walled cylinder that may be mounted on the hot air flue of a conventional water heater. In some jurisdictions, the double-walled construction is mandated, because the heat in the hot gases exiting the water heater may constitute a fire hazard or an injury risk. The double-walled construction includes a space between an outer wall and an inner wall with an insulating space in between. The walls are generally cylindrical in shape and are concentric in relation to one another. In a first embodiment of the energy re-claimer according to the present invention, the energy re-claimer includes a water conducting pipe consisting of generally straight and vertical sections connected to each other by 180° returns. The number and sizes of the cylindrical wall(s) and pipes is largely determined by the volume of gases flowing through the water heater. There must be sufficient space between the cylindrical wall(s) and the pipes to allow for the efficient flow of hot gases through the energy re-claimer to prevent a back draft of air from occurring.

The size of the water conducting pipe is preferably of the same diameter as the pipe through which the cold tap water flows. The water conducting pipe is preferably constructed of copper or another heat conducting material.

In another aspect of a first embodiment of the energy re-claimer according to the present invention, a plurality of generally horizontal heat exchange disks are mounted inside the single or double-walled cylinder. The disks have openings in them to accommodate the sections of water conducting pipe and also have openings to allow for the passage of hot gases. The disks are preferably constructed from a heat conducting material and provide another means of heat exchange between the hot gases and the tap water in the water conducting pipe.

In a second embodiment of the energy re-claimer according to the present invention, the water conducting pipe is formed into a straight section that is disposed parallel to the axis of the single or double-walled cylinder and extends vertically inside the cylindrical wall(s), where it is then connected to a number of curved pipe sections that form a coil. In another aspect of a second embodiment of the energy re-claimer according to the present invention, a number of braces are connected to the inner surface of the inner surface of the cylindrical wall(s) and to the water conducting pipe. The braces are preferably formed from a perforated tape or flat bar that supports the water conducting pipe and are preferably made of a heat conducting material, such as copper, that provides a further means of heat exchange between the hot gases passing through the energy re-claimer and the tap water passing through the water conducting pipe. Generally, the ends of the braces are attached to the inner surface of the cylindrical wall(s), while an intermediate portion of each brace is attached to the straight section of water conducting pipe and at least one curved section of the water conducting pipe.

In another aspect of the invention, which may be used with any embodiments of the energy re-claimer, a condensation collector may be installed between the exit of the water heater and the entrance to the energy re-claimer.

The condensation collector includes a pan for collecting condensate that may be formed as the hot gases are cooled in the energy re-claimer. The condensation collector is configured to the shape of the inlet to the energy re-claimer.

The condensation collector includes a number of spaced apart blades mounted on the pan to catch any condensate. Openings between each blade allows for the passage of hot gases.

The condensation collector is important for efficient operation of the water heater/energy re-claimer system because otherwise condensate that forms because of the cooling of the gases could fall through the water heater and extinguish the gas flame.

Further objects and advantages of this invention will become more apparent from the following description of the preferred embodiments of the invention, which, taken in conjunction with the accompanying drawings, will illustrate, by way of example, the principles of the invention.

BRIEF DESCRIPTION OF THE DRAWINGS

The foregoing and other objects, to the drawings in which:

FIG. 11 illustrates a sectional plan view of a second embodiment of an exemplary energy re-claimer in accordance with the present invention; and FIG. 12 illustrates a perspective view of the coiled water pipe of a second embodiment of an exemplary energy re-claimer in accordance with the present invention.

DETAILED DESCRIPTION OF THE PREFERRED EMBODIMENTS OF THE INVENTION

In the following description of the invention, reference is made to the accompanying drawings, which form a part thereof, and in which are shown, by way of illustration, exemplary embodiments illustrating the principles of the present invention and how it may be practiced. It is to be understood that other embodiments may be utilized to practice the present invention, and structural and functional changes may be made thereto without departing from the scope of the present invention.

Figure 1:
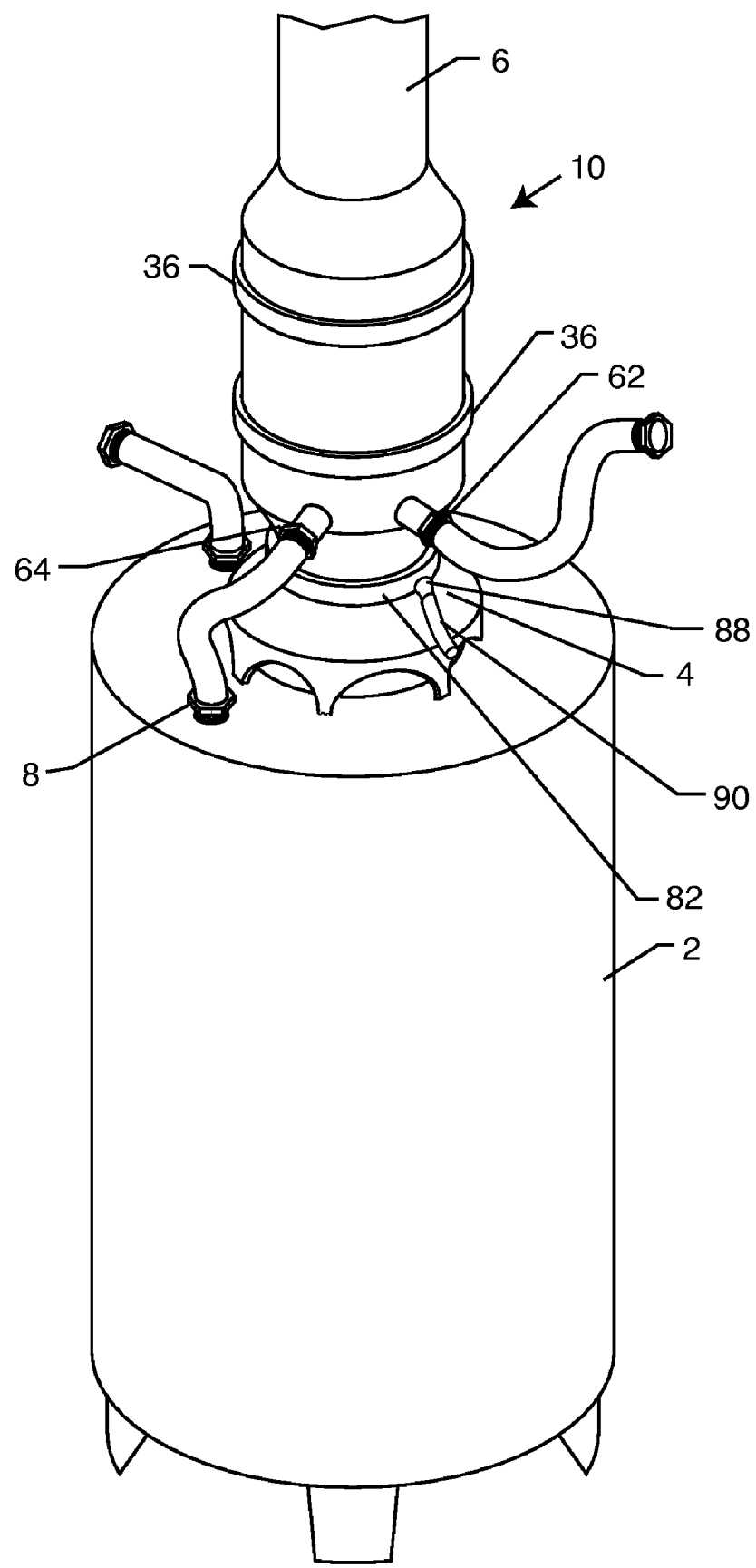
FIG. 1 illustrates a front view of a first embodiment of an exemplary energy re-claimer in accordance with the present invention mounted on a water heater.
Figure 2:
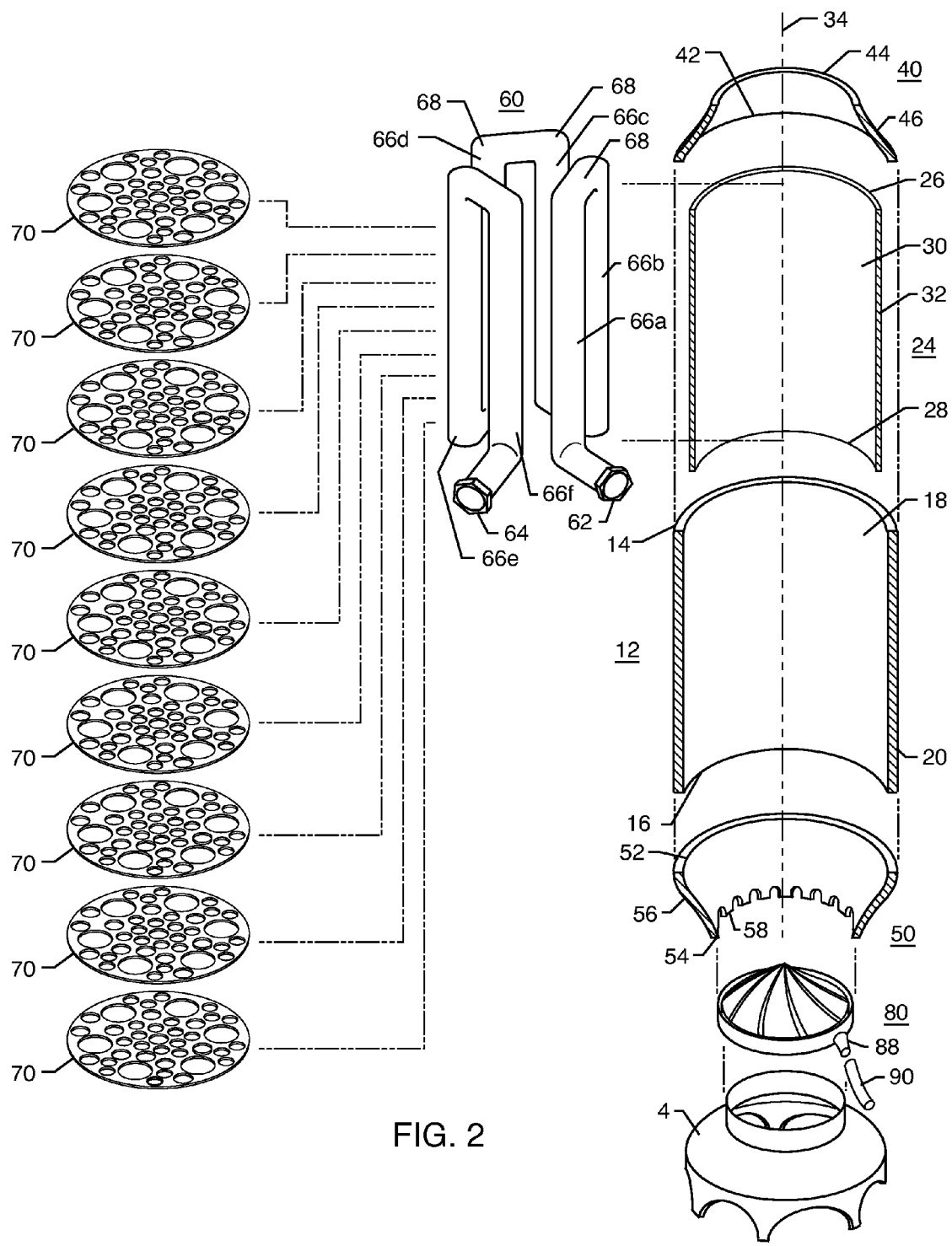
FIG. 2 illustrates an exploded perspective view of a first embodiment of an exemplary energy re-claimer in accordance with the present invention aspects and advantages will be better understood from the following detailed description of the preferred embodiments of the invention with reference.
Figure 3:
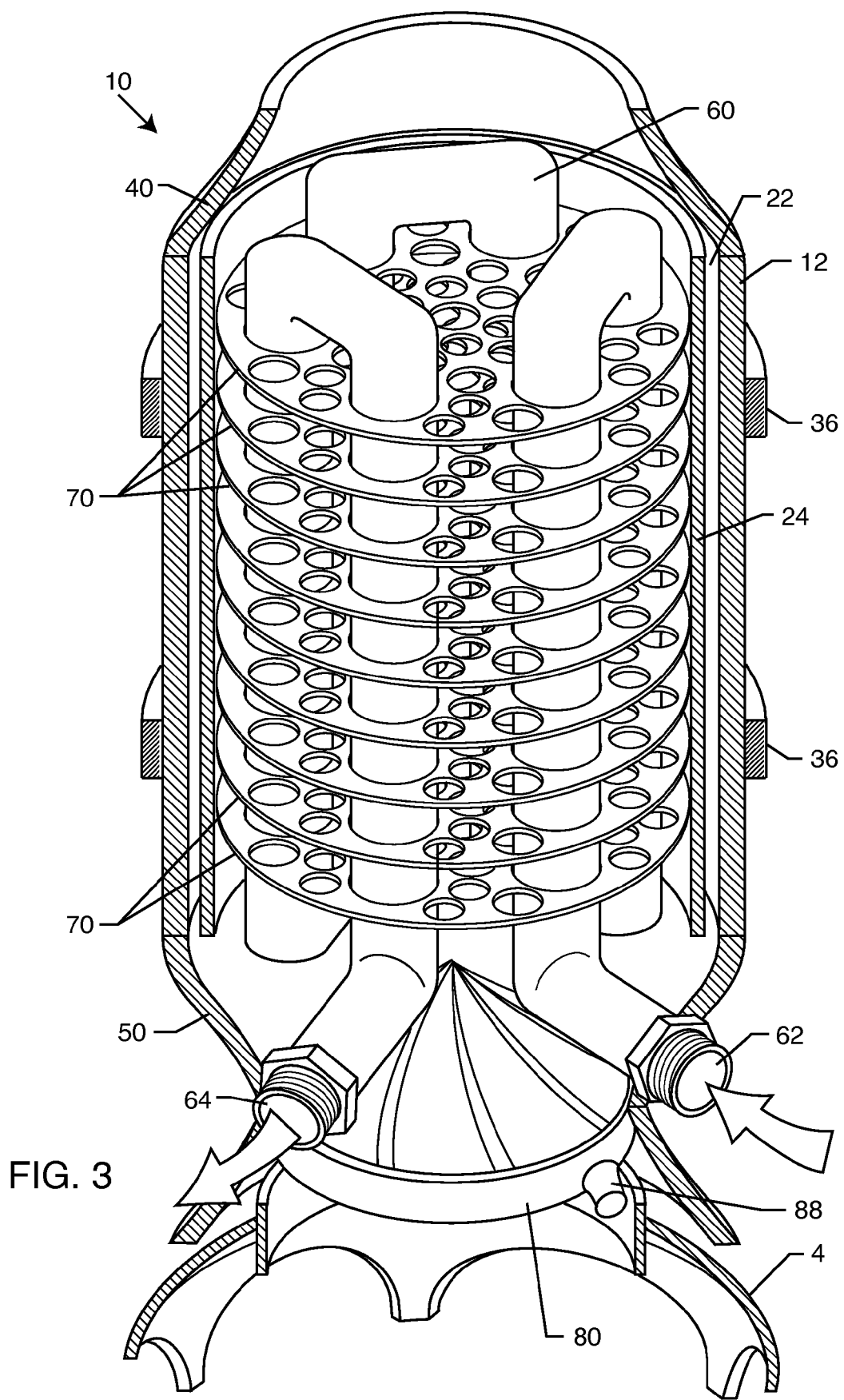
FIG. 3 illustrates a sectional perspective view of a first embodiment of an exemplary energy re-claimer in accordance with the present invention.
Figure 4:
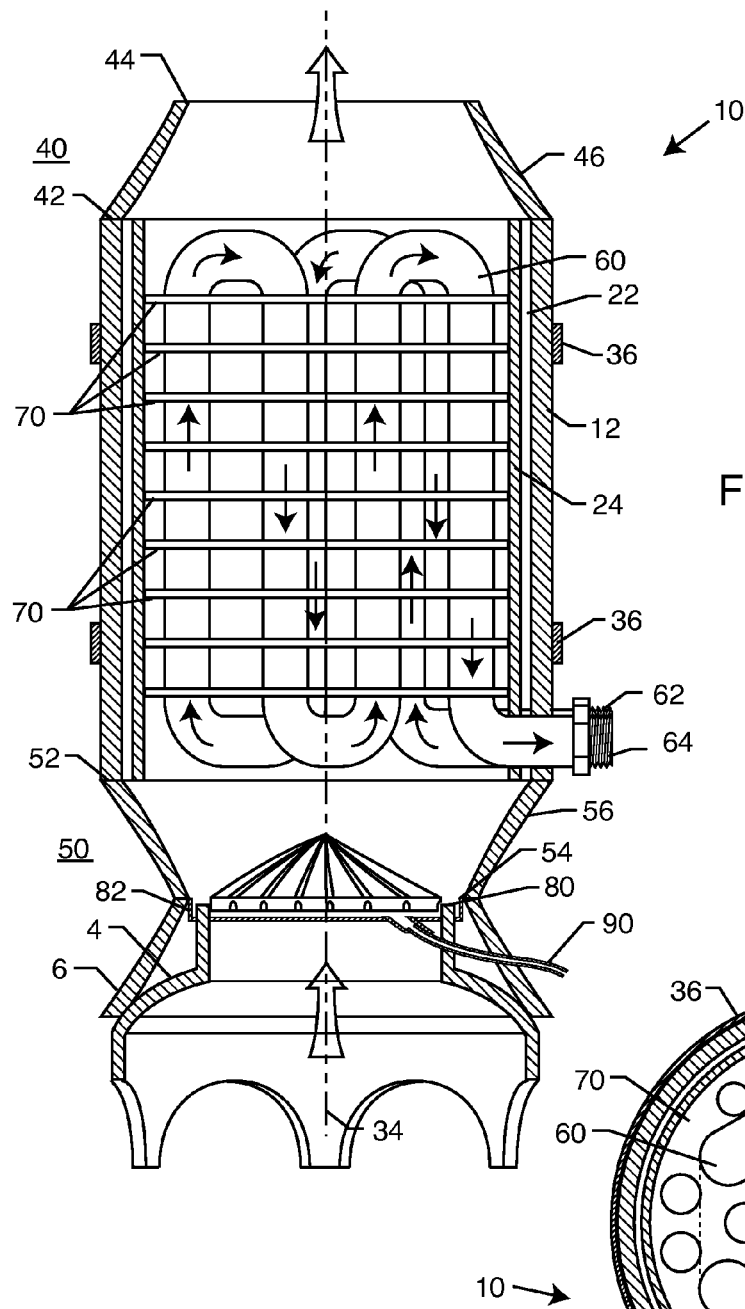
FIG. 4 illustrates a sectional side view of a first embodiment of an exemplary energy re-claimer in accordance with the present invention.
Figure 5:
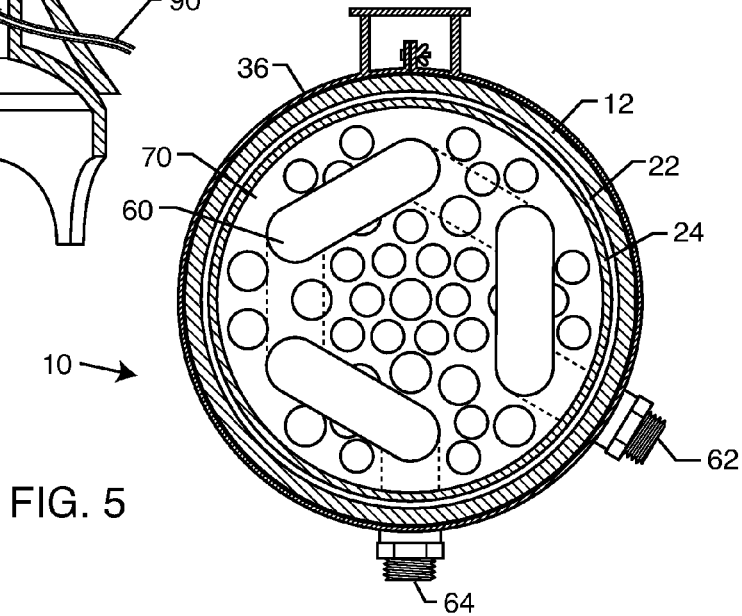
FIG. 5 illustrates a sectional plan view of a first embodiment of an exemplary energy re-claimer in accordance with the present invention.
Figure 6:
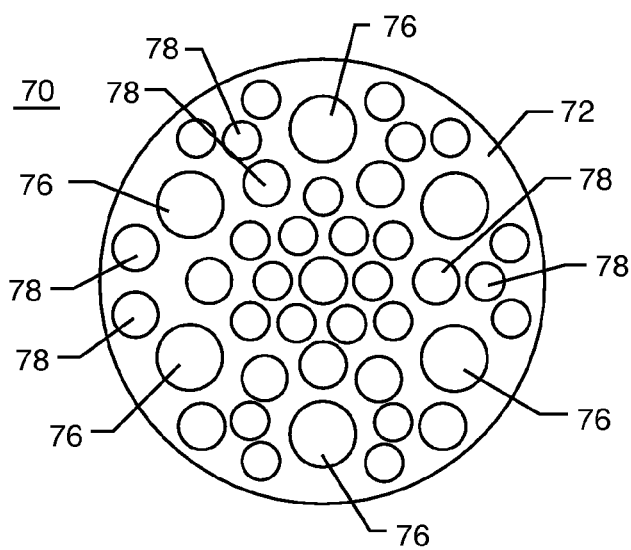
FIG. 6 illustrates a plan view of a heat exchange disk for use in a first embodiment of an exemplary energy re-claimer in accordance with the present invention.
Figure 7:
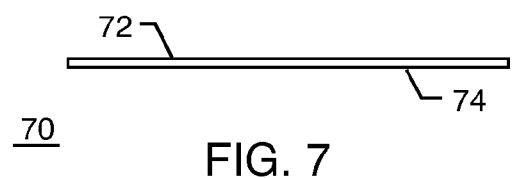
FIG. 7 illustrates a side view of a heat exchange disk for use in a first embodiment of an exemplary energy re-claimer in accordance with the present invention.
Figure 8:
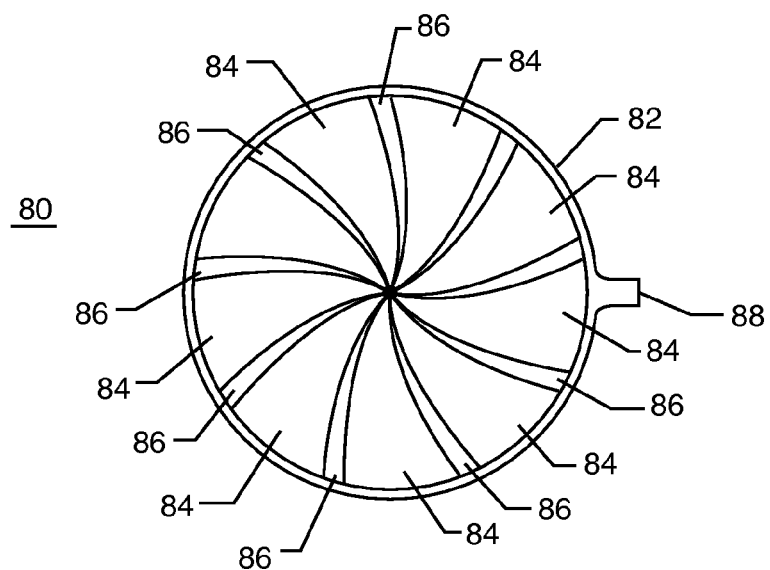
FIG. 8 illustrates a condensation collector for use with an energy re-claimer according to the present invention.
Figure 9:
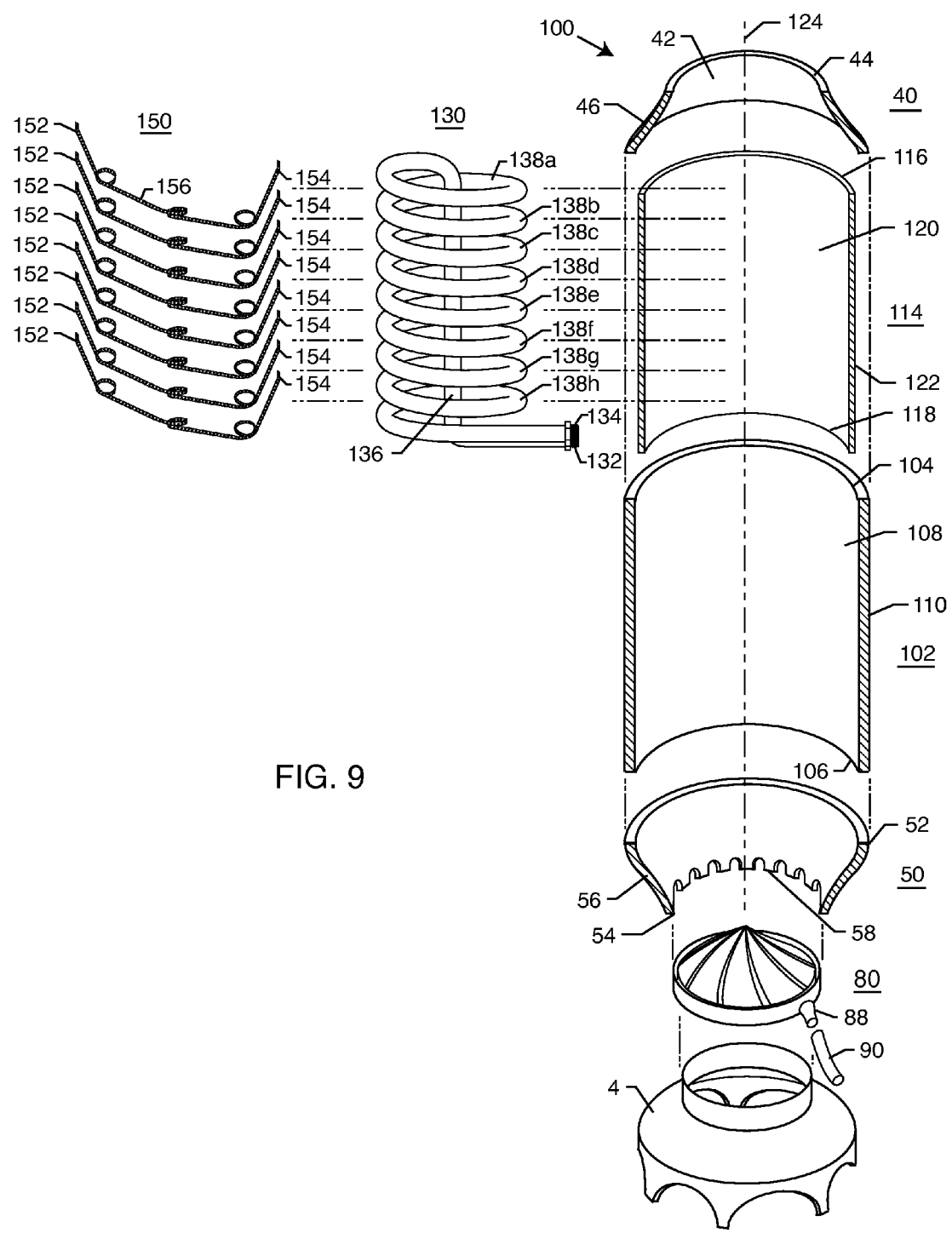
FIG. 9 illustrates an exploded perspective view of a second embodiment of an exemplary energy re-claimer in accordance with the present invention.
Figure 10:
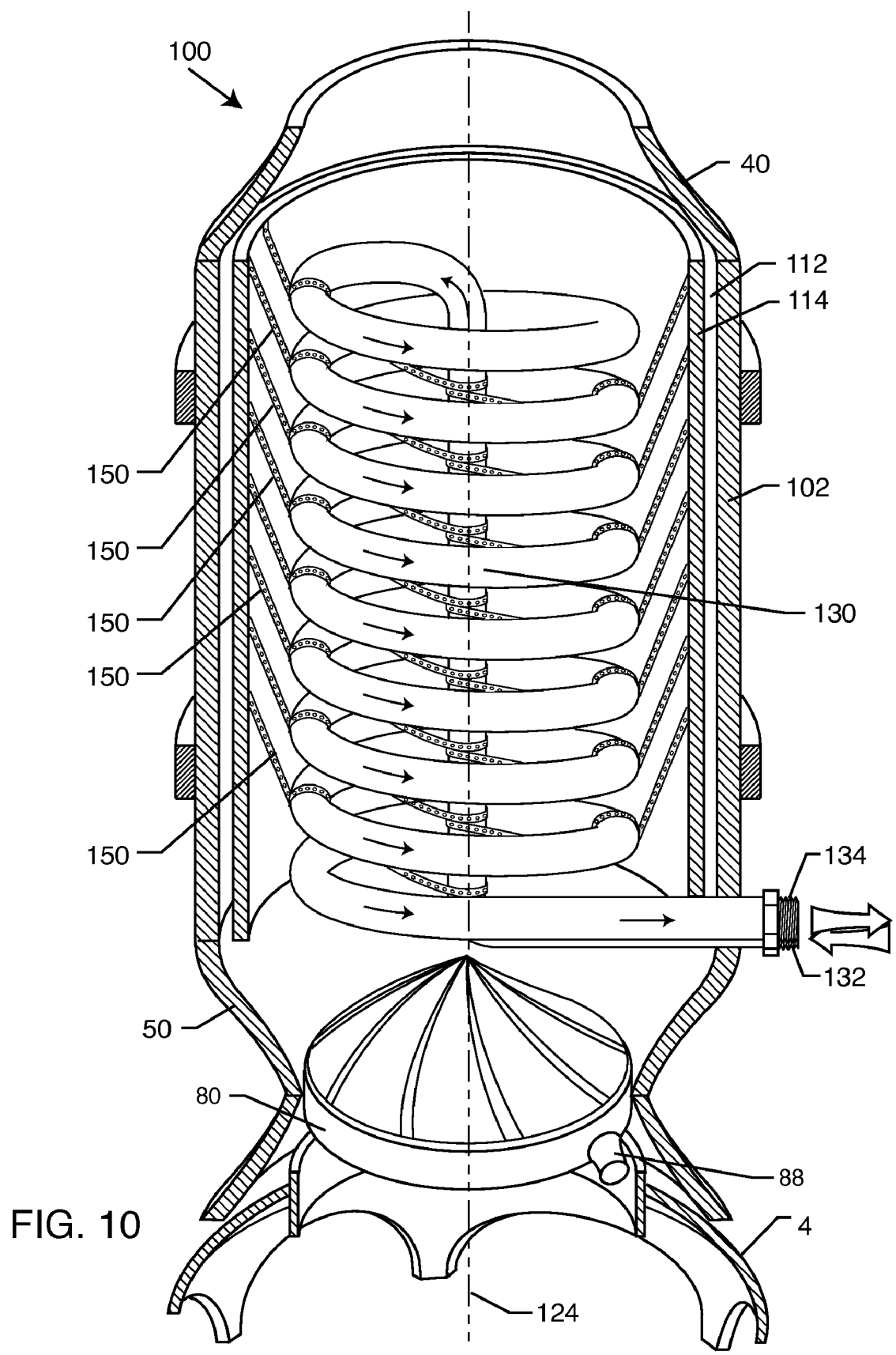
FIG. 10 illustrates a sectional side view of a second embodiment of an exemplary energy re-claimer in accordance with the present invention.

An exemplary first embodiment of an energy re-claimer is illustrated in FIGS. 1-5 and indicated by numeral 10. Energy re-claimer 10 is configured to fit on a water heater 2 between the draft diverter 4 and hot air flue 6, as best illustrated in FIG. 1. Tap water entering water heater 2 through inlet connection 8 is preheated in energy re-claimer 10 to take advantage of the energy in the hot gases exiting water heater 2 to reduce the amount of fuel needed to heat tap water for residential, commercial or industrial uses. Energy re-claimer 10 is generally secured to a facility wall (not shown) by means of braces 36.

Energy re-claimer 10 preferably includes a double-walled construction, which is mandated in some jurisdictions, but could have a single-walled construction as well. As illustrated, energy re-claimer 10 is of a generally cylindrical shape and includes outer wall 12 and inner wall 24, which are separated by spacers (not shown) to form space 22 between the two walls. Walls 12 and 24 are concentric to one another, with a longitudinal axis 34 extending parallel to the cylindrical walls and passing through the center of energy re-claimer 10.

Outer wall 12 includes a first end 14, second end 16, inner surface 18 and outer surface 20. Inner wall 24 includes first end 26, second end 28, inner surface 30, and outer surface 32. The space 22 formed between walls 12 and 24 provides insulation, thus reducing the temperature of outer surface 20 and reducing the chance of property damage or personal injury.

It will be apparent to those having skill in the art that energy re-claimer 10 may be constructed with only a single cylindrical wall where permitted by local regulations. Otherwise, the construction of the single and double-walled energy re-claimer are identical.

The outer diameter of energy re-claimer 10 is larger than the diameter of hot air flue 6 and draft diverter 4 to allow sufficient space for the hot gases to flow through without causing a back draft from reduced space taken up by energy re-claimer components, which will be described shortly.

Upper adapter section 40 is mounted between first end 14 and flue 6 and includes large diameter open end 42 disposed at first end 14 and small diameter open end 44 disposed at flue 6. Tapered side wall 46 extends between and connects large diameter open end 42 and small diameter open end 44.

Lower adapter portion 50 is mounted between second end 16 and draft diverter 4 and includes large diameter open end 52 disposed at second end 16 and small diameter open end 54 disposed at draft diverter 4. Tapered side wall 56 extends between and connects large diameter open end 52 and small diameter open end 54. Small diameter open end 54 may include scalloped edge 58, the purpose of which will be described later.

The first exemplary embodiment of energy re-claimer 10 also includes water pipe 60 disposed inside walls 12 and 24 and having an inlet 62 and an outlet 64. Preferably, water pipe 60 is made of a material that provides efficient heat exchange characteristics. The inventor has found that copper pipe works well for the energy re-claimer according to the present invention, but other materials could be used.

Water pipe 60 carries tap water from inlet 62 to outlet 64 and allows hot gases exiting from water heater 2 to heat up the tap water carried in pipe 60. In the first exemplary embodiment of energy re-claimer 10, water pipe 60 includes a plurality of straight sections 66 connected by returns 68. The number of straight sections is generally determined by the space that is available and the flow characteristics of the hot gases flowing over water pipe 60. For purposes of illustration and example, six straight sections 66a, 66b, 66c, 66d, 66e and 66f are shown, but energy re-claimer 10 may have different numbers of straight sections 66. Straight sections 66 are disposed generally parallel to longitudinal axis 34.

Another feature of the energy re-claimer 10 according to the first exemplary embodiment of the present invention is an array of heat exchange disks 70, which are best illustrated in FIGS. 2-7. Heat exchange disks 70 are disposed inside inner wall 24 and are oriented generally perpendicular to axis 34. Heat exchange disks 70 each include upper surface 72 and lower surface 74 and may vary in number, depending on the application. Heat exchange disks 70 include openings 76 through which straight sections 66 of water pipe 60 may pass, and air passages 78 to allow for the passage of hot gases through energy re-claimer 10 and are preferably spaced about two or three inches apart. Heat exchange disks 70 are preferably constructed of a material having desirable heat transfer properties, such as copper and enhance the ability of energy re-claimer 10 to transfer heat from the hot gases to the water in water pipe 60. Heat exchanger disks 70 are preferably soldered or welded to inner wall 24 and to straight sections 66.

FIGS. 2, 3, 4 and 8 illustrate a novel feature for use with the energy re-claimer of the present invention. Condensation collector 80 is designed to collect any condensation formed as the cooling gases pass through energy re-claimer 10. If the condensation is allowed to fall through to water heater 2, it is possible that the gas flame that provides heat could be extinguished.

Condensation collector 80 is located at small diameter open end 54 of lower adapter section 50 and includes a generally circular pan 82 oriented perpendicular to longitudinal axis 34. A plurality of blades 84 spaced apart by openings 86 between each blade are disposed on pan 82. Openings 86 allow for the passage of hot gases, while the blades cooperate with scalloped edge 58 on small diameter open end 54 to collect condensation. A drain connection 88 and tubing 90 connected to connection 88 allows the collected condensate to be drained from pan 82.

FIGS. 9-12 illustrate a second exemplary embodiment of an energy re-claimer according to the present invention, which is indicated by numeral 100. Energy re-claimer 100 is mounted on a water heater 2 in the same fashion as the first exemplary embodiment 10 of the energy re-claimer already described. Energy re-claimer 100 is generally secured to a facility wall (not shown) by means of braces 36.

Second embodiment 100 is similar in many ways to first embodiment 10 and preferably includes a double-walled configuration having an outer wall 102 and a concentric inner wall 114, which are spaced apart to create a space 112 between the two walls 102 and 114. Walls 102 and 114 are concentric to one another, with a longitudinal axis 124 extending parallel to the cylindrical walls through the center of energy re-claimer 100.

Outer wall 102 includes a first end 104, second end 106, inner surface 108 and outer surface 110. Inner wall 114 includes first end 116, second end 118, inner surface 120, and outer surface 122. The space 112 formed between walls 102 and 114 provides some insulation, thus reducing the temperature of outer surface 110 and reducing the chance of property damage or personal injury.

It will be apparent to those having skill in the art that energy re-claimer 100 may be constructed with only a single cylindrical wall where permitted by local regulations. Otherwise, the construction of the single and double-walled energy re-claimer 100 are identical.

In order to facilitate mounting energy re-claimer 100 to a water heater 2, the energy re-claimer 100 in accordance with an exemplary second embodiment includes lower adapter section 50 and upper adapter section 40 which are identical to the adapter sections attached to first embodiment 10 of the energy re-claimer according to the present invention. Because the construction of adapter sections 40 and 50 has already been described, it need not be repeated here.

Upper adapter section 40 is mounted between first end 104 and flue 6, while lower adapter section 50 is mounted between second end 106 and draft diverter 4.

The water pipe 130 of second embodiment 100 of an energy re-claimer in accordance with the present invention provides unique and novel features to enhance heat exchange between tap water flowing in pipe 130 and the hot gases flowing through the energy re-claimer. FIG. 12 illustrates the configuration of water pipe 130, which is primarily a coiled configuration. Water pipe 130 includes an inlet 132 for introducing tap water to water pipe 130 and outlet 134 where the now-heated water exits water pipe 130 and enters water heater 2. Water pipe 130 is preferably constructed of a material having desirable heat exchange characteristics, such as copper, and is configured of a straight section 136, which is disposed generally parallel to axis 124 and walls 102 and 114, and a plurality of curved sections 138 that are connected to straight section 136 by a connector 140. In the example shown, curved sections 138 are designated 138a-138h, although there may be a different number of curved sections depending on the application and space available.

Tap water enters water pipe 130 at inlet 132 and enters straight section 136, passes through curved sections 138, and exits water pipe 130 at outlet 134. As water passes through water pipe 130, hot gases from water heater 2 pass over water pipe 130 and heat the tap water in water pipe 130.

A unique and novel feature of the second embodiment 100 of the energy re-claimer according to the present invention is the inclusion of braces 150, which provide support for water pipe 130 and also enhance the ability of energy re-claimer 100 to transfer heat to the water in water pipe 130. Each brace 150 includes a first end 152, a second end 154, and an intermediate portion 156. First end 152 and second end 154 are each attached to inner surface 120 by means of rivets (not shown). Intermediate portion 156 is wrapped around a part of water pipe 130, preferably, and as illustrated, to at least one curved section 138 and straight section 136.

While braces 150 provide support for keeping water pipe 130 in place inside energy re-claimer 100, the inventor has found that by using a perforated copper tape for braces 150, not only is support provided for water pipe 130, but providing a perforated tape made of a material having good heat transfer characteristics, such as copper, provides the ability to transfer some of the heat in the gases passing through energy re-claimer 100 to water flowing inside water pipe 130. This feature represents a new and novel development in the field of heat transfer.

Second embodiment 100 of the energy re-claimer in accordance with the present invention may also be incorporated with the condensation collector 80 that was earlier described. Condensation collector 80, when incorporated with energy re-claimer 100, is disposed at small diameter open end 54 of lower adapter section 50.

The foregoing description of the exemplary embodiments and methods of play of the present invention have been presented for purposes of enablement, illustration, and description. It is not intended to be exhaustive of or to limit the present invention to the precise form discussed. There are, however, other configurations for energy re-claimers not specifically described herein, but with which the present invention is applicable. The present invention should therefore not be seen as limited to the particular embodiments described herein; rather, it should be understood that the present invention has wide applicability with respect to energy re-claimers and heat exchangers. Such other configurations can be achieved by those skilled in the art in view of the description herein. Accordingly, the scope of the invention is defined by the following claims.

What is claimed is:

1. An energy re-claimer for preheating water for a gas-fired water heater, said water heater having a draft diverter and a flue, said energy re-claimer comprising:
   a generally cylindrical outer wall having an inner surface and an outer surface, a first end and a second end;
   a generally cylindrical inner wall disposed inside said outer wall, said inner wall having an inner surface and an outer surface, a first end and a second end;
   a longitudinal axis passing through the center of the energy re-claimer parallel to said outer wall and said inner wall;
   a continuous pipe for carrying water for heating, said pipe disposed inside said inner wall; and
   a plurality of heat exchange disks disposed inside said inner wall, said disks oriented perpendicular to said axis, wherein each of said heat exchange disks further comprises:
      an upper surface and a lower surface;
      a plurality of openings for passage of said pipe; and
      a plurality of hot air passages,
   whereby, water passing through said pipe is heated by gases from said water heater.

2. The energy re-claimer according to claim 1 further comprising:
   an upper adapter section having a large diameter open end and an opposed small diameter open end, and a tapered side wall extending between said ends, said upper adapter section configured to connect to said flue at said small diameter open end and said upper end of said outer wall at said large diameter open end; and
   a lower adapter section having a large diameter open end and a small diameter open end, and a tapered side wall extending between said ends, said lower adapter section configured to connect to said water heater at said small diameter open end and to said lower end of said outer wall at said large diameter open end.

3. The energy re-claimer according to claim 2, wherein said small diameter open end of said lower adapter second includes a scalloped edge.

4. The energy re-claimer according to claim 3, further including a condensation collector disposed between said lower adapter section and said draft diverter, said condensation collector comprising:
   a generally circular pan oriented perpendicular to said axis;
   a plurality of blades disposed on said pan; and
   a plurality of openings, each opening disposed between each pair of said blades.

5. The energy re-claimer according to claim 4, wherein said condensation collector further comprises:
   a drain connection to said pan; and
   tubing connected to said drain connection to conduct condensation collected in the pan away from the energy-re-claimer.

6. An energy re-claimer for preheating water for a gas-fired water heater, said water heater having a draft diverter and a flue, said energy re-claimer comprising:
   a generally cylindrical outer wall having an inner surface and an outer surface, a first end and a second end;
   a generally cylindrical inner wall disposed inside said outer wall, said inner wall having an inner surface and an outer surface, a first end and a second end;
   a longitudinal axis passing through the center of the energy re-claimer parallel to said outer wall and said inner wall;
   a continuous coiled pipe for carrying water for heating, said pipe disposed inside said inner wall, said pipe configured of a straight section extending parallel to said axis and a plurality of interconnected curved sections, one of said curved sections connected to said straight section, said curved sections forming a coil about said axis; and
   a plurality of braces extending between said inner surface of said inner wall and said coiled pipe,
   whereby, water passing through said coiled pipe is heated by gases from said water heater.

7. The energy re-claimer according to claim 6, wherein each of said braces have a first end, a second end, and an intermediate portion, each brace attached to said straight section and one of said curved sections at said intermediate portion and to said inner surface of said inner wall at said first end and said second end.

8. The energy re-claimer according to claim 6, wherein said braces are constructed of a heat conducting metal.

9. The energy re-claimer according to claim 6 further comprising:
   an upper adapter section having a large diameter open end and an opposed small diameter open end, and a tapered side wall extending between said ends, said upper adapter section configured to connect to said flue at said small diameter open end and said upper end of said outer wall at said large diameter open end; and
   a lower adapter section having a large diameter open end and a small diameter open end, and a tapered side wall extending between said ends, said lower adapter section configured to connect to said water heater at said small diameter open end and to said lower end of said outer wall at said large diameter open end.

10. The energy re-claimer according to claim 9, wherein said small diameter open end of said lower adapter second includes a scalloped edge.

11. The energy re-claimer according to claim 10, further including a condensation collector disposed between said lower adapter section and said draft diverter, said condensation collector comprising:
   a generally circular pan oriented perpendicular to said axis;
   a plurality of blades disposed on said pan; and
   a plurality of openings, each opening disposed between each pair of said blades.

12. The energy re-claimer according to claim 11, wherein said condensation collector further comprises:
   a drain connection to said pan; and
   tubing connected to said drain connection to conduct condensation collected in the pan away from the energy-re-claimer.

* * * * *